US006825623B2

(12) United States Patent
Onozawa et al.

(10) Patent No.: US 6,825,623 B2
(45) Date of Patent: Nov. 30, 2004

(54) OPENING AND CLOSING CONTROL DEVICE OF OPENING AND CLOSING MEMBER FOR A VEHICLE

(75) Inventors: Satoru Onozawa, Anjo (JP); Yasuaki Hiraki, Nisshin (JP); Seika Matsui, Chiryu (JP); Mizuho Morimitsu, Kariya (JP)

(73) Assignees: Aisin Seiki Kabushiki Kaisha, Kariya (JP); Toyota Shatai Kabushiki Kaisha, Kariya (JP)

( * ) Notice: Subject to any disclaimer, the term of this patent is extended or adjusted under 35 U.S.C. 154(b) by 0 days.

(21) Appl. No.: 10/408,263

(22) Filed: Apr. 8, 2003

(65) Prior Publication Data

US 2003/0214264 A1 Nov. 20, 2003

(30) Foreign Application Priority Data

Apr. 8, 2002 (JP) ...................................... 2002-104993

(51) Int. Cl.[7] ................................................ H02P 1/00

(52) U.S. Cl. ....................... 318/257; 318/283; 318/280; 318/445; 318/449; 318/466; 318/461; 318/468

(58) Field of Search ................................ 318/257, 283, 318/280, 445, 449, 466, 461, 468; 49/291, 199

(56) References Cited

U.S. PATENT DOCUMENTS

| | | | | | |
|---|---|---|---|---|---|
| 5,341,597 | A | * | 8/1994 | Stoltenberg | 49/199 |
| 5,537,013 | A | * | 7/1996 | Toyozumi et al. | 318/283 |
| 5,764,008 | A | | 6/1998 | Hahn et al. | |
| 5,932,931 | A | * | 8/1999 | Tanaka et al. | 307/10.1 |
| 6,125,583 | A | * | 10/2000 | Murray et al. | 49/291 |

FOREIGN PATENT DOCUMENTS

| | | |
|---|---|---|
| DE | 195 07 541 C | 2/1996 |

* cited by examiner

*Primary Examiner*—Karen Masih
(74) *Attorney, Agent, or Firm*—Burns, Doane, Swecker & Mathis, L.L.P.

(57) ABSTRACT

An opening and closing control device of opening and closing member for a vehicle includes a motor for actuating the opening and closing member, and a control unit for driving the motor so as to become a predetermined target speed and for driving the motor in reverse direction as a detection of entrapped obstacles when the actual speed of the motor reaches to an entrapment judgment speed which is set lower than the target speed. The control unit sets a threshold speed which is higher than the target speed and outputs an output duty to the motor for achieving the target speed by feedback control. The control unit switches the output duty after the actual speed of the motor becomes higher than the threshold speed to an output by feedforward control based on the target speed.

5 Claims, 6 Drawing Sheets

Fig. 4

OPENING AND CLOSING CONTROL DEVICE OF OPENING AND CLOSING MEMBER FOR A VEHICLE

CROSS REFERENCE TO RELATED APPLICATIONS

This application is based on and claims priority under 35 U.S.C. §119 with respect to a Japanese Patent Application 2002-104993, filed on Apr. 8, 2002, the entire content of which is incorporated herein by reference.

FIELD OF THE INVENTION

The present invention relates to an opening and closing control device of opening and closing member for a vehicle.

BACKGROUND OF THE INVENTION

Recent vehicles including an opening and closing member such as a back door and a sunroof are provided with an opening and closing control device. The opening and closing member is operated by a motor which is driven so as to reach to a predetermined target speed. When the actual speed of the motor reaches to an entrapment judgment speed which is set lower than the target speed, the opening and closing control device detects entrapped obstacles and drives the motor in reverse direction.

In a conventional device, when the opening and closing member is operated, output duty fed to the motor is increased or decreased by feedback control on the basis of the difference between the target speed and the actual speed so as to close the actual speed to the target speed. One example of the conventional device is shown in FIG. 7. In this example, an artificial force is applied to the opening and closing member which is operated toward the opening condition and the opening speed of the opening and closing member is momentarily increased. FIG. 7(*a*) shows output duty which is supplied to the motor. The target speed of the motor and the actual speed which is obtained by feedback control in FIG. 7(*b*). Further, in FIG. 7(*b*), the predetermined entrapment judgment speed which is set lower than the target speed for judging entrapment of obstacles is shown. FIG. 7(*c*) shows a condition in which a flag is generated by the judgment of entrapped obstacles by the control device when the actual speed of the motor becomes lower than the entrapment judgment speed, In the above prior control device, however, in case of that the opening speed of the opening and closing member is increased by, for example, the working of human power to the opening and closing member, erroneous judgment of entrapped obstacles is carried out as follows. As shown in FIG. 7(*b*), in this example, satisfactory control is carried out by feedback control first three seconds so as to coincide the actual speed of the motor with the target speed in this time, the output duty is increased or decreased properly by feedback control.

Then, when three seconds pass, the actual speed of the motor increases suddenly as shown in FIG. 7(*b*). When the actual speed increases suddenly, the feedback control operates remarkably and the control device decreases the output duty suddenly for approaching the excessive actual speed to the target speed. As shown in FIG. 7(*a*), as the output duty decreases, the actual speed begins to decrease suddenly about one second later too. The artificial external force which acts to the opening and closing member acts momentarily in usual. Accordingly, when the actual speed begins to decrease, the external force is usually removed. Thereby, the moving speed of the opening and closing member which is on the way of the opening operation decreases suddenly by the removal of the external force and the decrease of the output duty. As a result, the actual speed of the motor becomes lower than the target speed and further becomes lower than the entrapment judgment speed. The control device judges erroneously that this phenomenon corresponds to the entrapped obstacles and the flag of the entrapment judgment is generated as shown in FIG. 7(*c*).

In addition to this, for example, in case of that some rattle exist in a driving mechanism of the opening and closing member, the opening and closing member vibrates during opening and closing operation. In such case, excessive accelerate or decelerate by the feedback control occurs and the entrapped obstacles is erroneously judged.

SUMMARY OF THE INVENTION

It is an object of the present invention to provide an opening and closing control device of opening and closing member for a vehicle which can prevent the erroneous judgment of entrapped obstacles.

According to one aspect of the present invention, an opening and closing control device of opening and closing member for a vehicle includes a motor for actuating the opening and closing member, and a control means for driving the motor so as to become a predetermined target speed and for driving the motor in reverse direction as a detection of entrapped obstacles when the actual speed of the motor reaches to an entrapment judgment speed which is set lower than the target speed. The control means sets a threshold speed which is higher than the target speed and outputs an output duty to the motor for achieving the target speed by feedback control. The control means switches the output duty after the actual speed of the motor becomes higher than the threshold speed to an output by feedforward control based on the target speed.

According to another aspect of the present invention, an opening and closing control device of opening and closing member for a vehicle includes a motor for actuating the opening and closing member, and a control means for driving the motor so as to become a predetermined target speed and for driving the motor in reverse direction as a detection of entrapped obstacles when the actual speed of the motor reaches to an entrapment judgment speed which is set lower than the target speed. The control means sets a threshold speed which is higher than the target speed. The control means prohibits the judgment of the entrapment for a predetermined time from when the actual speed of the motor becomes lower than the threshold speed again after the actual speed becomes higher than the threshold speed.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

A Preferred embodiments of the present invention will be explained referring to drawings.

First Embodiment

Figure 1:
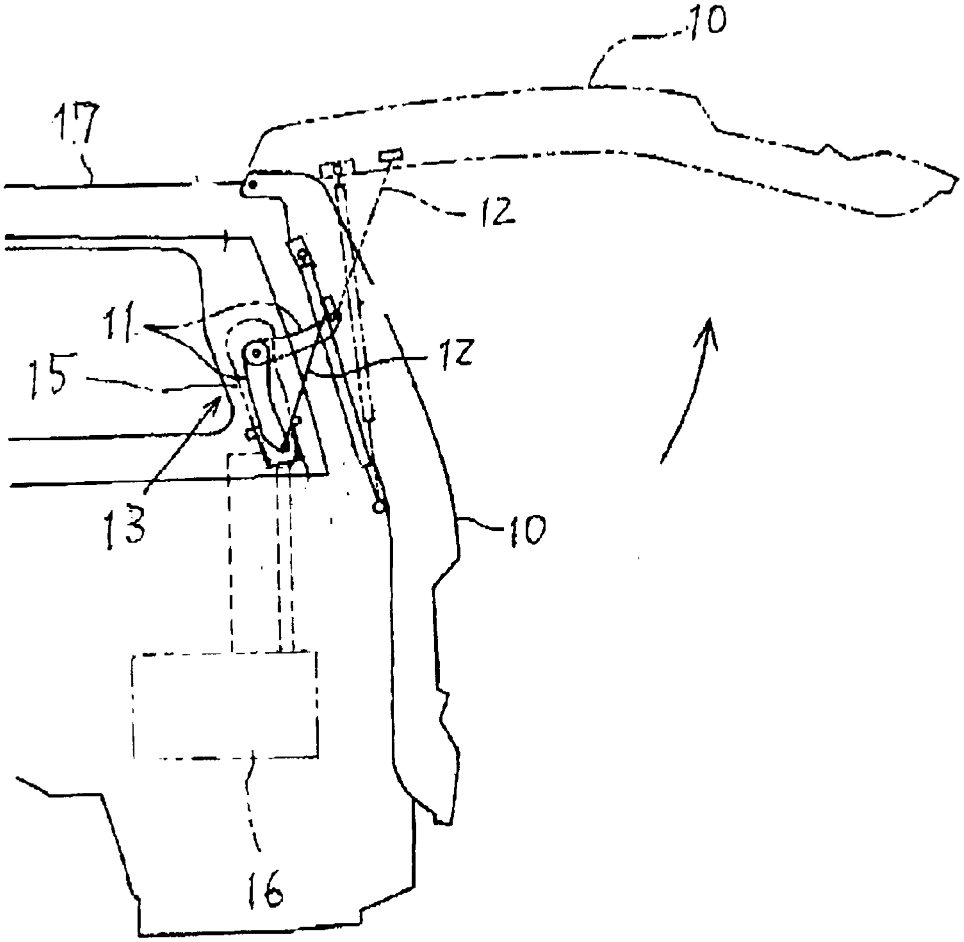
FIG. 1 is a schematic illustration of an opening and closing control device of opening and closing member for a vehicle according to the present invention.

FIG. 1 shows a back door 10 of a vehicle which corresponds to an opening and closing member. The back door 10 is hinged on a body 17 of the vehicle and is driven by a drive unit 13 so as to open and close a rear opening of the body 17. The drive unit 13 fixed to the body 17 and includes a motor 14 and a driving mechanism 15 unitary connected one another. The driving mechanism 15 is connected to the back door 10 through door arms 11, 12. When the motor 14 is operated by a control device 16, the opening operation and the closing operation of the back door 10 are carried out.

The control device 16 comprises a driving control part which controls the rotational speed of the motor 14, an entrapment judgment part which judges whether an obstacle (extraneous material) is entrapped between the back door 10 and the body 17 and so on. Especially, the driving control part has a function for determining an output duty to the motor 14, a function for monitoring an actual speed of the motor 14 by means of a rotational sensor (not shown) and for comparing the actual speed to a predetermined target speed, a function for feedback controlling the output duty on the basis of the comparison result, and a function for judging whether an obstacle is entrapped between the back door 10 and the body 17.

Figure 2:
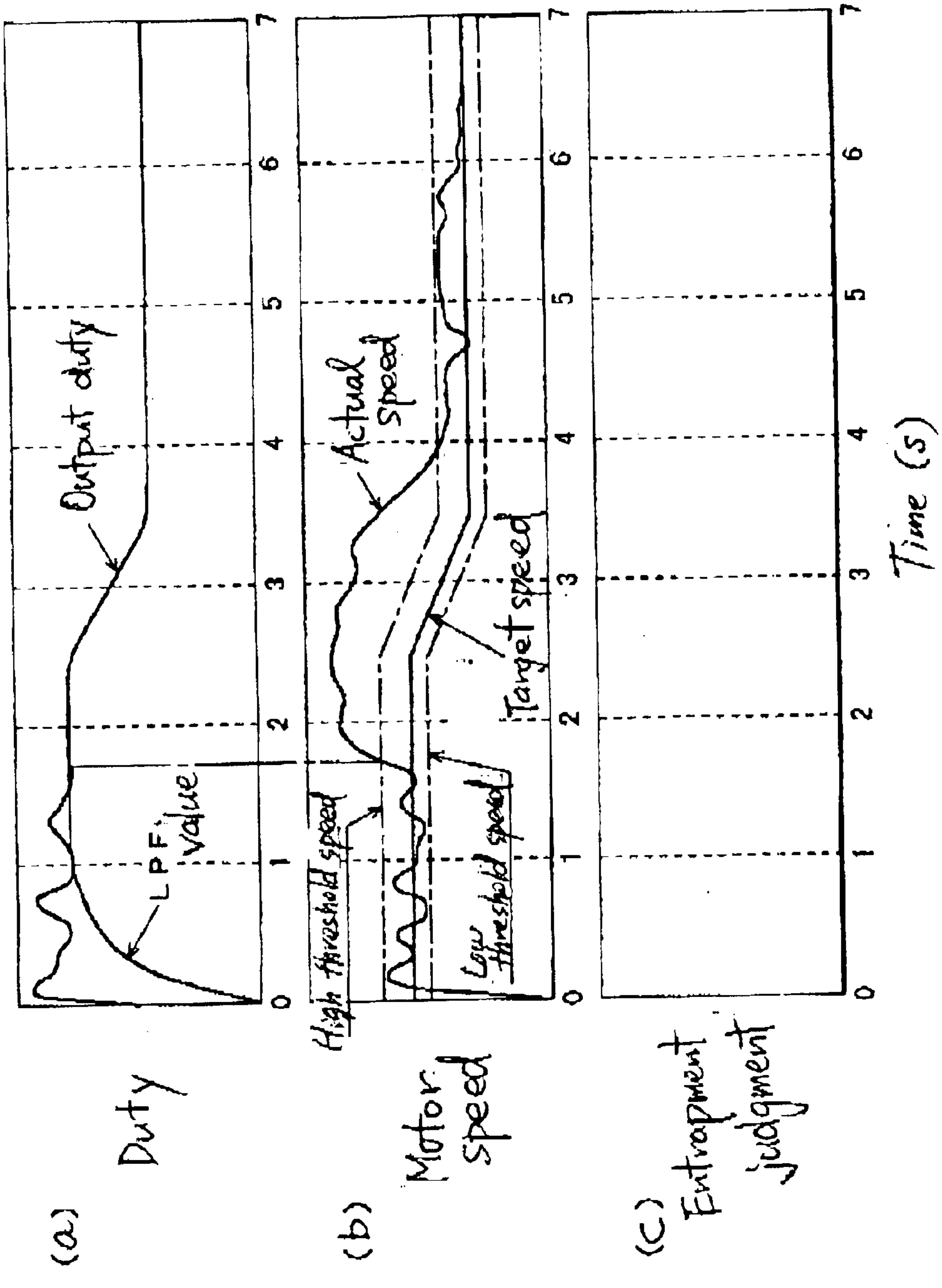
FIG. 2 is a diagram of an opening and closing control device of opening and closing member for a vehicle according to a first embodiment and a second embodiment of the present invention.

The operation of the entrapment judgment is described below according to FIG. 2 and FIG. 3. As shown in FIG. 2(*b*), the control device 16 controls the rotational speed of the motor 14 so that the back door 10 opens and closes with the predetermined speed (FIG. 3①, ②. Further, as shown in FIG. 2(*b*), the control device 16 monitors always the rotational speed of the motor 14 by means of the rotational sensor (not shown). In the control device 16, an entrapment judgment speed which is lower than the target speed with a predetermined threshold value is set. The control device 16 judges that the obstacle is entrapped when the actual speed of the motor 14 reaches to the entrapment judgment speed, and drives motor 14 in reverse direction by means of relay (not shown).

In this first embodiment, the control device 16 has the following function for avoiding erroneous judgment of the entrapment. In case of that the back door 10 is opened and closed, when the special external force is not applied, the opening and closing speed of the back door 10 does not jumble normally. However, there is a case in which the opening and closing speed of the back door 10 jumbles when the back door 10 is accelerated by human power and so on. Experience shows that the jumble or upset of the opening and closing speed is caused from the action of the external force to the acceleration side.

Figure 3:
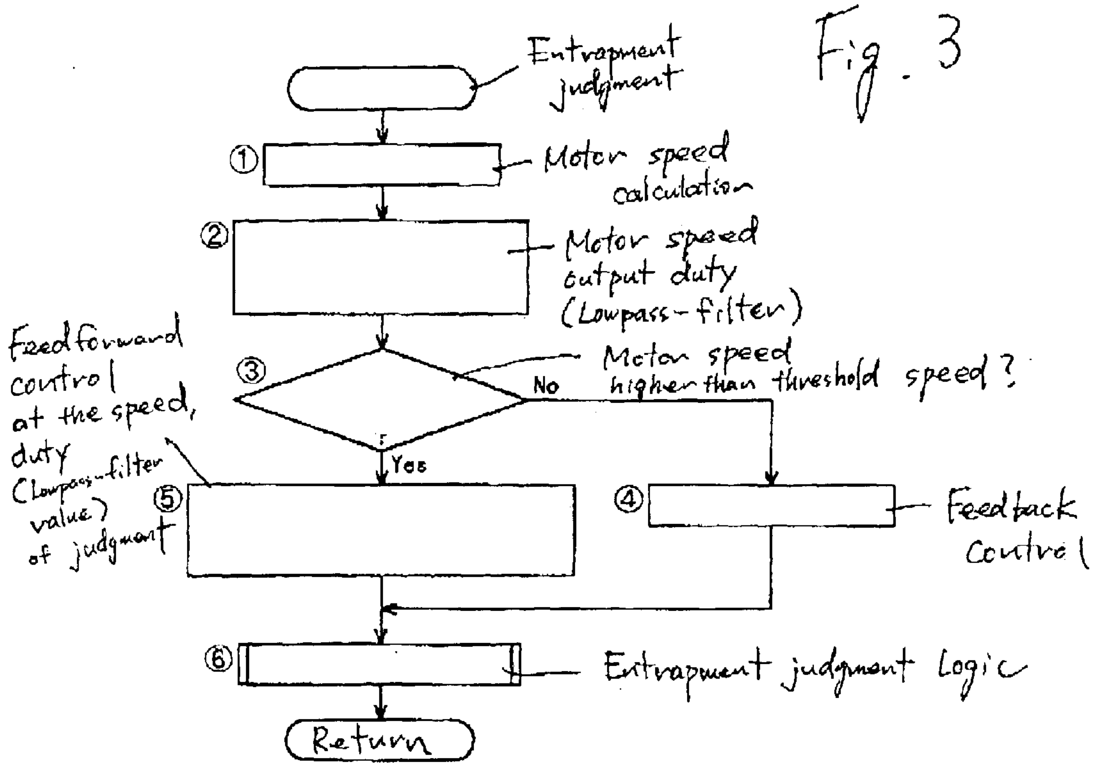
FIG. 3 is a general flow chart for judging entrapment according to the first embodiment and the second embodiment of the present invention.

In the control device 16, in order to prevent the erroneous judgment of the entrapment, at first it is judged whether the back door 10 is accelerated (FIG. 3 ③). In this embodiment, a threshold speed is set higher than the target speed as shown in FIG. 2(*b*). FIG. 2(*b*) shows a case in which the back door 10 is artificially accelerated before the lapse of 2 sec, after the back door 10 begins to open. Until the acceleration is applied, the output duty is controlled by feedback control on the basis of the target speed and thereby the motor 14 is driven (FIG. 3 ④). Accordingly, the output duty repeats increasing and decreasing and the actual speed of the motor 14 oscillates with a focus on the target speed.

At the moment when the actual speed becomes higher than the threshold speed before the lapse of 2 sec., the control device 16 judges that the external force was applied. Then, the output duty at the time is set to a base and from then on the output duty is outputted by feedforward control (FIG. 3⑤). At the same time, in this moment, the control device 16 calculates a ratio between a signal output concerning the target speed and a signal output concerning the output duty. Then, on the occasion of the subsequent feedforward control, the output duty is determined by the change of the target speed and the calculated ratio (fixed ratio) (FIG. 2(*a*)).

As mentioned above, since the subsequent change of the output duty is determined by the calculated fixed ratio and the target speed, it is able to make the output duty follow to the increasing and decreasing of the target speed. As a result, the actual speed can be properly changed in response to the change of the target speed of the motor 14 and furthermore it is able to maintain the difference between the actual speed and the target speed within a predetermined range.

According to the control device of the first embodiment, in case of that the back door 10 decelerates after being accelerated, the output duty does not decrease suddenly and the actual speed of the motor 14 does not decrease to the entrapment judgment speed erroneously. Therefore, according to the control device, it is able to efficiently prevent the erroneous judgment of the entrapment (FIG. 2(*c*)).

It is presumable to use feedforward control from the start of the operation of the back door 10 for controlling the output duty. In this case, it is able to prevent the erroneous judgment by momentary applying of the external force. However, in case of that the electric voltage for driving the motor decreases or that the resistance of the driving unit increases, it is not able to obtain a proper actual speed by supplying the output duty. Accordingly, in order to adapt the actual speed to the target speed as far as possible, the operation of the feedback control at the beginning of the opening and closing operation of the back door is advantageous.

Second Embodiment

In the above first embodiment, the output duty which is the initial value of the feedforward control is determined by the output duty at the moment when the actual speed becomes higher than the threshold speed. In this second embodiment, the output duty is filtered by lowpass filter (LPF) during the feedback control and a duty output LPF value is recognized. The duty output LPF value when the actual speed of the motor becomes higher than the threshold speed is set to an initial output duty of the feedforward control.

The output duty during the feedback control does not only oscillate relatively widely but also gets mixed various noises as such amplitude. Namely, the output duty at the moment when the actual speed of the motor becomes higher than the threshold speed not necessarily be proper as the initial value of the subsequent feedforward control. In this second embodiment, since the output duty during the feedback control is filtered by lowpass filter, it is able to comprehend more stable and proper output duty. Further, since the duty output LPF value is set to an initial output duty of the feedforward control when the feedforward control is transited, it is able to approximate the actual speed to the target speed. Thereby, It is able to further improve the effect of the prevention of the erroneous judgment of the entrapment.

Third Embodiment

In the third embodiment, a control device prohibits the judgment of the entrapment for a predetermined time from when the actual speed of the motor becomes lower than the threshold speed again after the actual speed becomes higher than the threshold speed. Other functions of the control device are the same as the control device of the first and second embodiments. For example, when the back door is automatically opened and closed, there is a case in which artificial force is applied for a moment in the direction of the operation of the back door and in which the artificial force is quickly removed. In this case, the back door is in the condition in which the vibration is applied. As mentioned above, since the opening and closing operation of the back door is operated by feedback control, rapid deceleration generates just after the external force is removed and the erroneous judgment of the entrapment is apt to generate. In this embodiment, the control device prohibits the judgment of the entrapment for a predetermined time from when the actual speed of the motor becomes lower than the threshold speed again after the actual speed becomes higher than the threshold speed.

Figure 4:
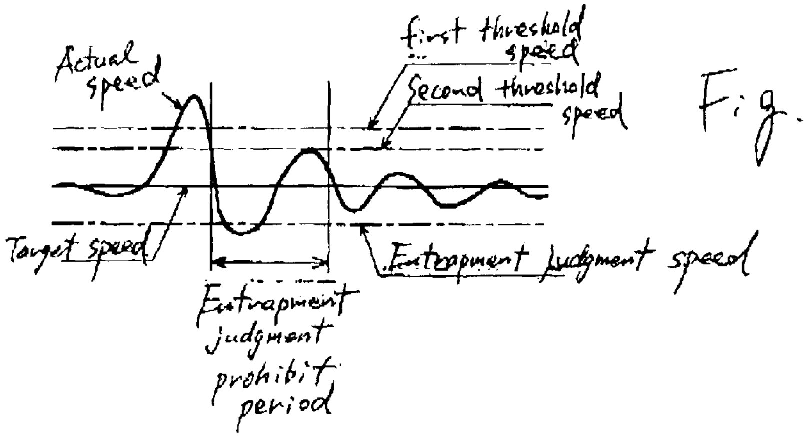
FIG. 4 is a diagram of an opening and closing control device of opening and closing member for a vehicle according to a third embodiment of the present invention.

Concretely speaking, as shown in FIG. 4, in order to judge the acceleration of the back door, a first threshold speed being higher than the target speed and a second threshold speed are set. The second threshold speed is higher than the target speed and is lower than the first threshold speed. Further, an entrapment judgment speed which is lower than the target speed is set.

As shown in FIG. 4, when the back door receives the acceleration at the moment, the actual speed of the motor increases suddenly. Then, at first, the actual speed reaches to the first threshold speed. Then, the actual speed increases for a moment and then decreases, and then becomes lower than the second threshold speed being lower than the first threshold speed. In this embodiment, this moment is starting timing for the entrapment judgment prohibit period. This period is for example, 0.2 sec. to 0.3 sec. If this period is too long, the period in which the entrapment judgment is not performed lengthens. On the other hand, if the period is too short, the prohibit period is ended before the actual speed becomes lower than the entrapment judgment speed and the effectiveness of the control device becomes impaired.

In this embodiment, the prohibit period starts from when the actual speed becomes lower than the second threshold speed. Thereby, the entrapment judgment prohibit period can be shortened as far as possible while ensuring the effectiveness of the control device. Namely, the first threshold speed is a speed for performing the acceleration judgment and is set higher than the target speed. On the contrary, the entrapment judgment speed is lower than the target speed. When the actual speed becomes lower than the entrapment judgment speed, the control device prohibits the entrapment judgment. Therefore, it is desirable for shorten the prohibit period as far as possible that the starting point of the prohibit period is set just before the actual speed reaches to the entrapment judgment speed. The second threshold speed is set between the first threshold speed and the entrapment judgment speed. Thereby, the entrapment judgment prohibit period can be short, namely it is able to lengthen the period in which the entrapment judgment is performed. As a result, it is able to accord the entrapment judgment function with the erroneous judgment prevention function and useful control device can be obtained.

The operation for prohibiting the entrapment judgment is described below according to FIG. 5 and FIG. 6. In FIG. 6(*b*), the target speed and the actual speed are shown. In FIG. 6(*a*), in the beginning of the opening and closing operation, the output duty is controlled by feedback control so that the actual speed follows to the target speed. After the acceleration judgment of the back door is performed, the output duty is controlled by feedforward control. The first and second threshold speeds are set higher than the target speed. The entrapment judgment speed which is lower than the target speed is set.

Figure 5:
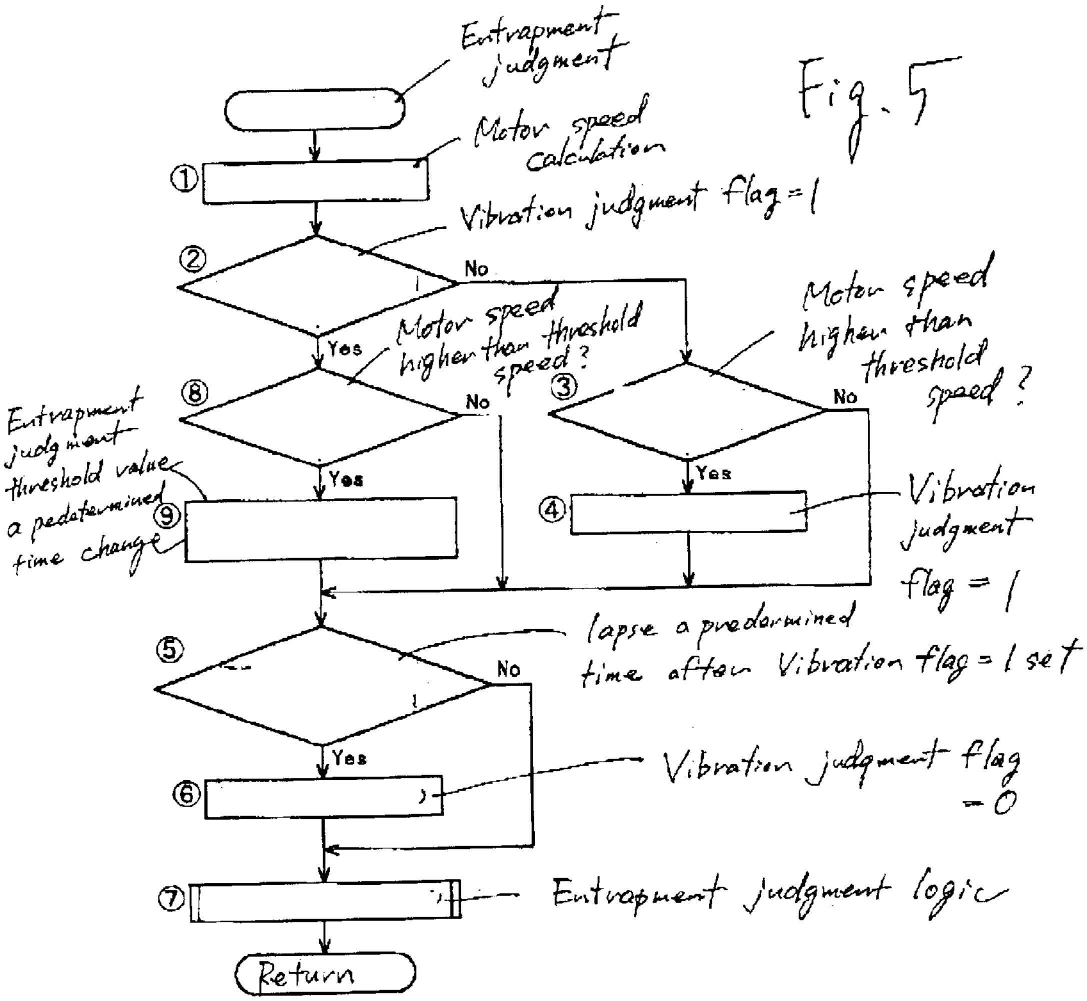
FIG. 5 is a flow chart for judging entrapment according to the third embodiment of the present invention.
Figure 6:
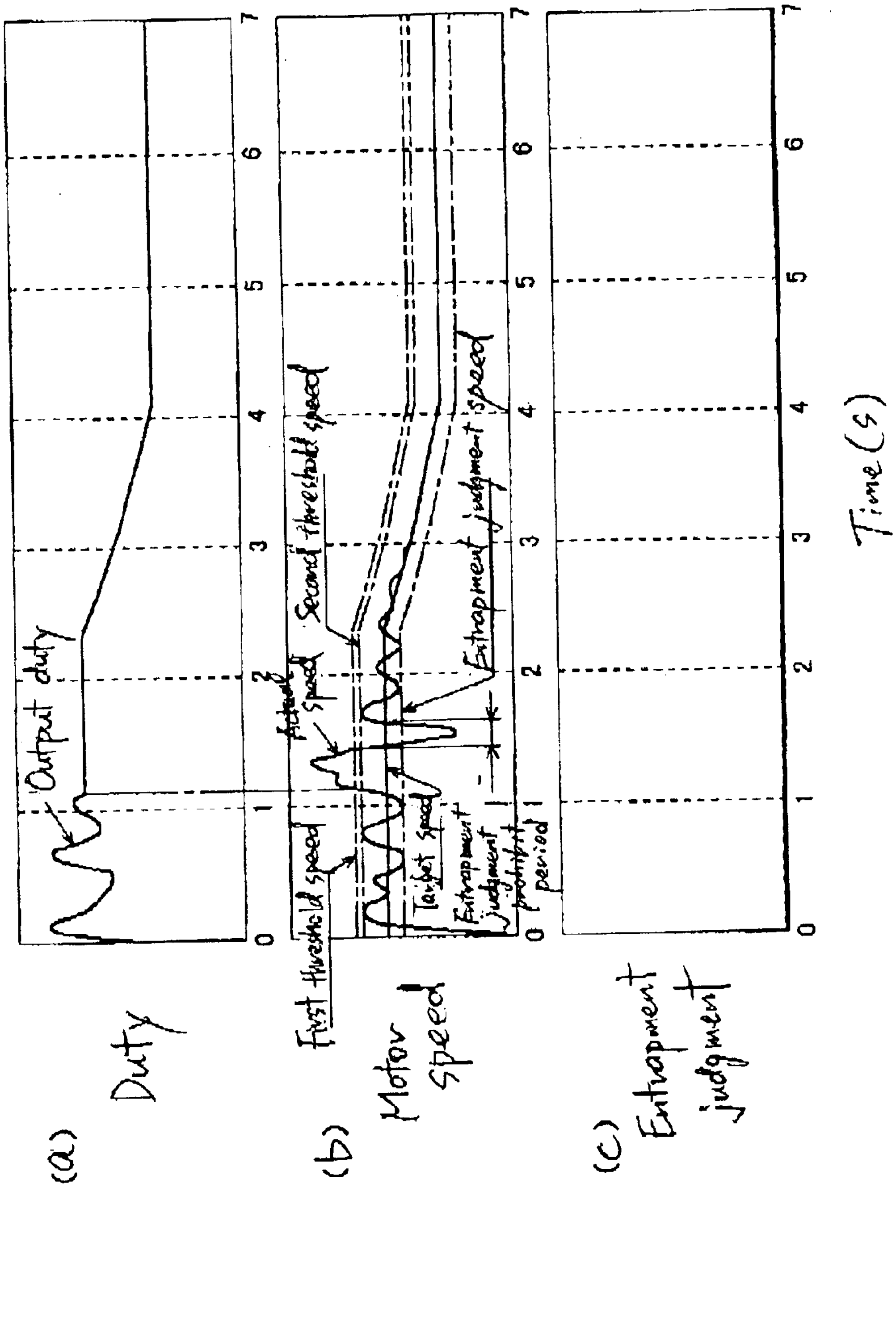
FIG. 6 is a diagram of an opening and closing control device of opening and closing member for a vehicle according to the third embodiment of the present invention.
Figure 7:
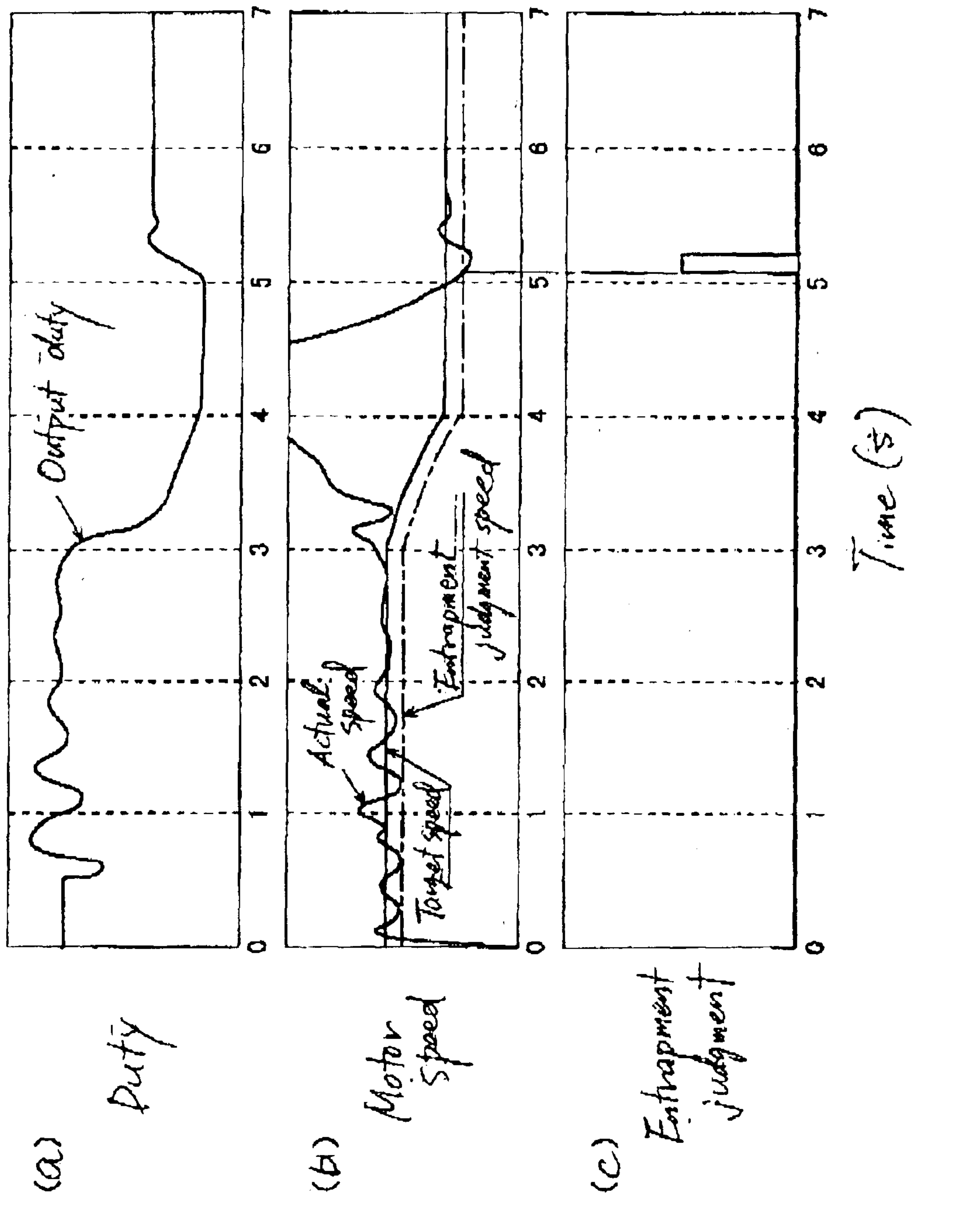
FIG. 7 is a diagram of the prior control.

Until just after the lapse of 1 sec. from the start of the driving of the back door, the rotational speed of the motor is controlled by feedback control (FIG. 5①). In this time, it is judged whether the actual speed is higher than the first threshold speed (FIG. 5②). Namely, when the actual speed is already higher than the first threshold speed, a flag which corresponds to the performance of the acceleration judgment is provided. The judge steps are changed in response to with or without of this flag.

When the flag is not provided, it is judged whether the actual speed is higher than the first threshold speed (FIG. 5③). In this time, in case that it is judged that the actual speed is higher than the first threshold speed, the back door is accelerated and the flag is provided (FIG. 5④). In FIG. 6(*b*), it is shown that the actual speed is higher than the first threshold speed after the lapse of 1 sec. In this embodiment, the subsequent output duty is changed to the feedforward control and the stable output duty in response to the target speed is supplied (FIG. 6(*a*)).

After then, the control device judges whether the predetermined period, after the flag is set up, is passed or not. In other words, this judges whether the entrapment judgment prohibit period is passed or not (FIG. 5⑤) When the entrapment judgment prohibit period is already passed, the flag is deleted so as to finish the entrapment judgment prohibit period (FIG. 5⑥). Then, the control device proceeds to the judgment logic for the entrapment (FIG. 5⑦). On the other hand, when the entrapment judgment prohibit period is not passed, the control device proceeds to the judgment logic for the entrapment with the flag (FIG. 5⑦).

In the judgment logic for the entrapment, even if the actual speed with the flag is less than the entrapment judgment speed, the entrapment judgment is not operated and the rotation of the motor is continued. By contraries, if the actual speed without the flag is less than the entrapment judgment speed, the control device judged that something is caught so that the rotational direction of the driving motor is changed.

When the flag is already set up (FIG. 5②), the control device judges whether the actual speed is less than the second threshold speed (FIG. 5⑧). If the actual speed is more than the second threshold speed, the control device judges whether the predetermined period, after the flag is set up, is passed or not (FIG. 5⑤). In other words, when the actual speed is more than the first threshold speed and when the actual speed is also more than the second threshold speed, the entrapment judgment prohibit period is counted from the first flag is set up. In short, the actual speed exceeds the first threshold speed firstly.

However, it judged that the actual speed is less than the second threshold speed (FIG. 5 ⑧), the staring point of the forbidding catching is reset (FIG. 5 ⑨). In other words, this condition that the actual speed is less than the second threshold speed, but the actual speed is not reduced the catching judgment speed level. As this system can delay the starting point of the entrapment judgment, the period of the entrapment judgment becomes short and correctly.

The round area around the dotted line in FIG. 6 (*b*) shows a condition that the actual speed is less than the entrapment judgment speed during the period of the entrapment judgment. In this condition, it is also possible that the catch judgment is omitted as shown In FIG. 6 (*c*). The inventor found a theory that the actual speed is rapidly increased and then the actual speed is rapidly decreased. According to the theory, the controller of this embodiment stops the catch judgment so as to be correctly.

Here, FIG. 6 (*a*) Illustrates a feed forward control, which the output duty follows the target speed after judging the acceleration. However, it is possible that a total operation of the door is operated a feed back control.

What we claim is:

1. An opening and closing control device of opening and closing member for a vehicle comprising:

a motor for actuating the opening and closing member; and a control means for driving the motor so as to become a predetermined target speed and for driving the motor in reverse direction as a detection of entrapped obstacles when the actual speed of the motor reaches to an entrapment judgment speed which is set lower than the target speed; wherein the control means sets a threshold speed which is higher than the target speed, outputs an output duty to the motor for achieving the target speed by feedback control, and switches the output duty after the actual speed of the motor becomes higher than the threshold speed to an output by feedforward control based on the target speed.

2. An opening and closing control device of opening and closing member for a vehicle as recited in claim 1, wherein the output duty of the feedforward control is determined by a ratio between the target speed and the output duty when the actual speed becomes the threshold speed.

3. An opening and closing control device of opening and closing member for a vehicle as recited in claim 1, wherein a duty output LPF value which the output duty is filtered by lowpass-filter (LPF) is recognized and the feedforward control is carried out according to the duty output LPF value when the actual speed becomes higher than the threshold speed.

4. An opening and closing control device of opening and closing member for a vehicle comprising:

a motor for actuating the opening and closing member; and a control means for driving the motor so as to become a predetermined target speed and for driving the motor in reverse direction as a detection of entrapped obstacles when the actual speed of the motor reaches to an entrapment judgment speed which is set lower than the target speed; wherein the control means sets a threshold speed which is higher than the target speed, and prohibits the judgment of the entrapment for a predetermined time from when the actual speed of the motor becomes lower than the threshold speed again after the actual speed becomes higher than the threshold speed.

5. An opening and closing control device of opening and closing member for a vehicle as recited in claim 4, wherein a second threshold speed which is higher than the target speed and which is lower than the threshold speed is set and the entrapment judgment prohibit period is started when the actual speed becomes lower than the threshold speed and becomes lower than the second threshold speed.

* * * * *